United States Patent
Bähre

[11] 3,726,096
[45] Apr. 10, 1973

[54] FASCINES

[75] Inventor: Ernst August Bähre, Frankfurt/Main, Germany

[73] Assignee: Farbwerke Hoechst Aktiengesellschaft Vormals Meister Lucius - Bruning, Frankfurt/Main, Germany

[22] Filed: May 17, 1971

[21] Appl. No.: 143,822

[30] Foreign Application Priority Data

May 19, 1970  Germany..................P 20 24 255.1

[52] U.S. Cl.........................................61/37
[51] Int. Cl...................................E02b 3/12
[58] Field of Search........................61/37, 3, 4, 5; 161/22, 23, 24

[56]  References Cited
UNITED STATES PATENTS

| | | | |
|---|---|---|---|
| 3,607,586 | 9/1971 | Hankus | 161/24 |
| 3,299,640 | 1/1967 | Nielsen | 61/3 |
| 3,426,536 | 2/1969 | Danz | 61/3 |
| 3,477,897 | 11/1969 | Hankus | 161/24 X |
| 3,559,407 | 2/1971 | Delft | 61/3 |

*Primary Examiner*—Reinaldo P. Machado
*Assistant Examiner*—Philip C. Kannan
*Attorney*—Connolly and Hutz

[57] ABSTRACT

There are disclosed fascines which can be easily installed and which give a lasting support to sand sedimentation from quicksands. Said fascines consist of a pile and a sheet made from thermoplastic material and cut like a comb into narrow strips wrapped around and fastened to said pile.

4 Claims, 2 Drawing Figures

INVENTOR
ERNST AUGUST BÄHRE

FASCINES

The present invention relates to fascines.

It is known that, in such shore and beach areas which are menaced by erosion, the deposit of quicksands is tried to be enhanced in various ways in order to ensure the stability of the coast.

For example, it is quite usual to dig hedge-like brushwood into such places where the growth of plants is not yet possible. However, on account of their short life and their considerable fragility, these hedgerows, despite the great expenses in labor and costs for their installation, do not offer lasting protection. Furthermore, it has been tried for this purpose to use perforated sheets or latticed structures made from plastic materials, which are fastened to posts in fence-like manner. By this method some improvements were obtained, but there are still large requirements of fascine elements which can be easily installed and which give a lasting support to sand sedimentation.

It has now been found that the sedimentation of sand can be considerably improved by fascines consisting of a sheet made from thermoplastic material cut into narrow strips like a comb and wrapped around and fastened to a pile.

Such fascines especially are preferred, the pile of which is a tube made from thermoplastic material whereon can be attached further tube connections with wrapped around comb-like cut sheets made from thermoplastic material.

As thermoplastic material, polyolefins, polyvinyl chloride, vinyl chloride copolymers and mixtures containing preponderant amounts of such polymers are advantageously used.

The invention will now be described, by way of example, with reference to the accompanying drawings.

Figure 1:
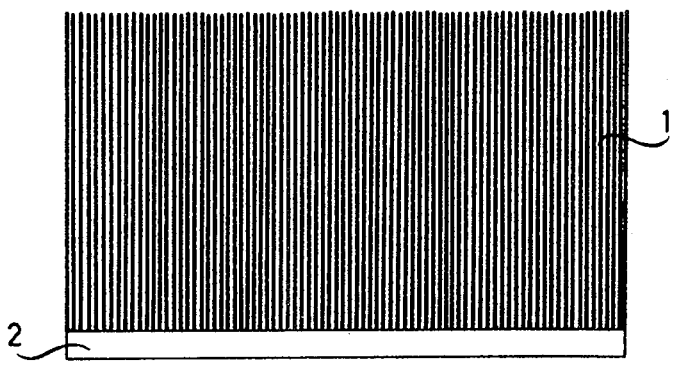
Figure 2:
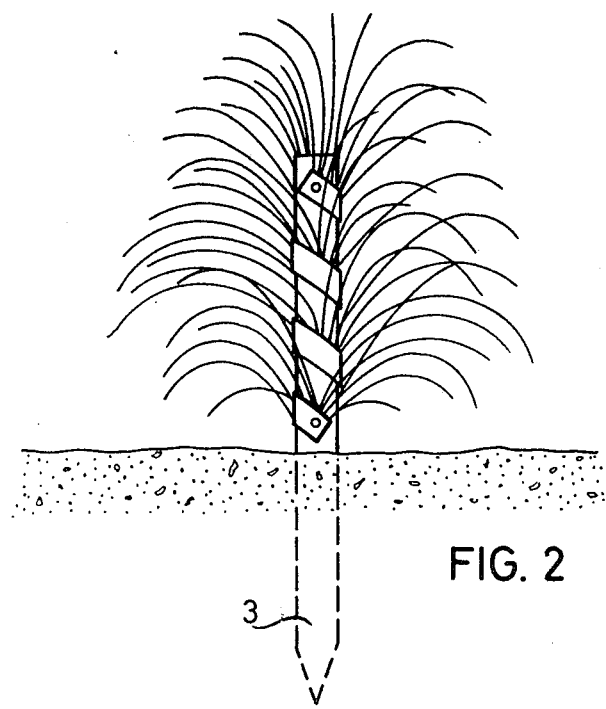

The fascines of the present invention are advantageously manufactured as follows: a plastic sheet, thickness for example 2 mm, length 1 m and width 60 cm, is cut like a comb into strips of a width of about 1 cm (1), while leaving a continuous boundary strip of a width of about 5 cm (2) (as shown in FIG. 1). This boundary strip is nailed to the top of the pile or fastened to it in any other possible way, and wrapped around the pile (3) in helical turns in downward direction, while it is simultaneously fastened (as shown in FIG. 2). These fascines are then pile-driven into the shore either single or in groups.

The fascines so obtained are distinguished, as to their appearance as well as to their effect on quicksands, by their very near similarity to plants, for example to lymegrass. This similarity may still be enhanced by using correspondingly dyed plastic sheets. The sweeping force of the wind for sand is broken by these fascines and a deposit of sand thus is made possible.

The fascines as described may be successfully used also in places which are occasionally flooded at high water. As soon as the water has withdrawn, the fascines without being replaced can again be effective for the deposit of quicksands. As soon as enough sand thus has been collected, the formation of dunes may be enhanced by planting lymegrass.

Furthermore, the fascines of the invention may also be used advantageously below the water line. In such places where the sand is washed away by flowing water, they may cause the deposit of sand and thus also have their influence on the regulation of rivers.

The fascines as described thus offer additional means of taking simple, effective and profitable protection measures in accordance with the corresponding local conditions.

What is claimed is:

1. In a process for the promotion of sand sedimentation, the use of fascines comprising a sheet made from thermoplastic material, the sheet being partially cut into having an array of narrow strips like a comb and being wrapped around and fastened to a pile, and implanting the piles of the fascines in the sand with the arrays of comblike narrow strips disposed above the sand.

2. In a process as claimed in claim 1, wherein the pile comprises a tube made from thermoplastic material.

3. In a process as claimed in claim 1, wherein the thermoplastic material is selected from the group consisting of a polyolefin, polyvinyl chloride, vinyl chloride copolymer or a mixture preponderantly containing these polymers.

4. In a process as claimed in claim 1 wherein the portions of the sheets of thermoplastic material remaining from the partial cutting comprise a boundary strip, and the boundary strips being helically wrapped and secured to the piles.

* * * * *